Dec. 3, 1946. N. G. BAKER 2,412,029
DIESEL ENGINE
Filed April 25, 1944 2 Sheets-Sheet 2
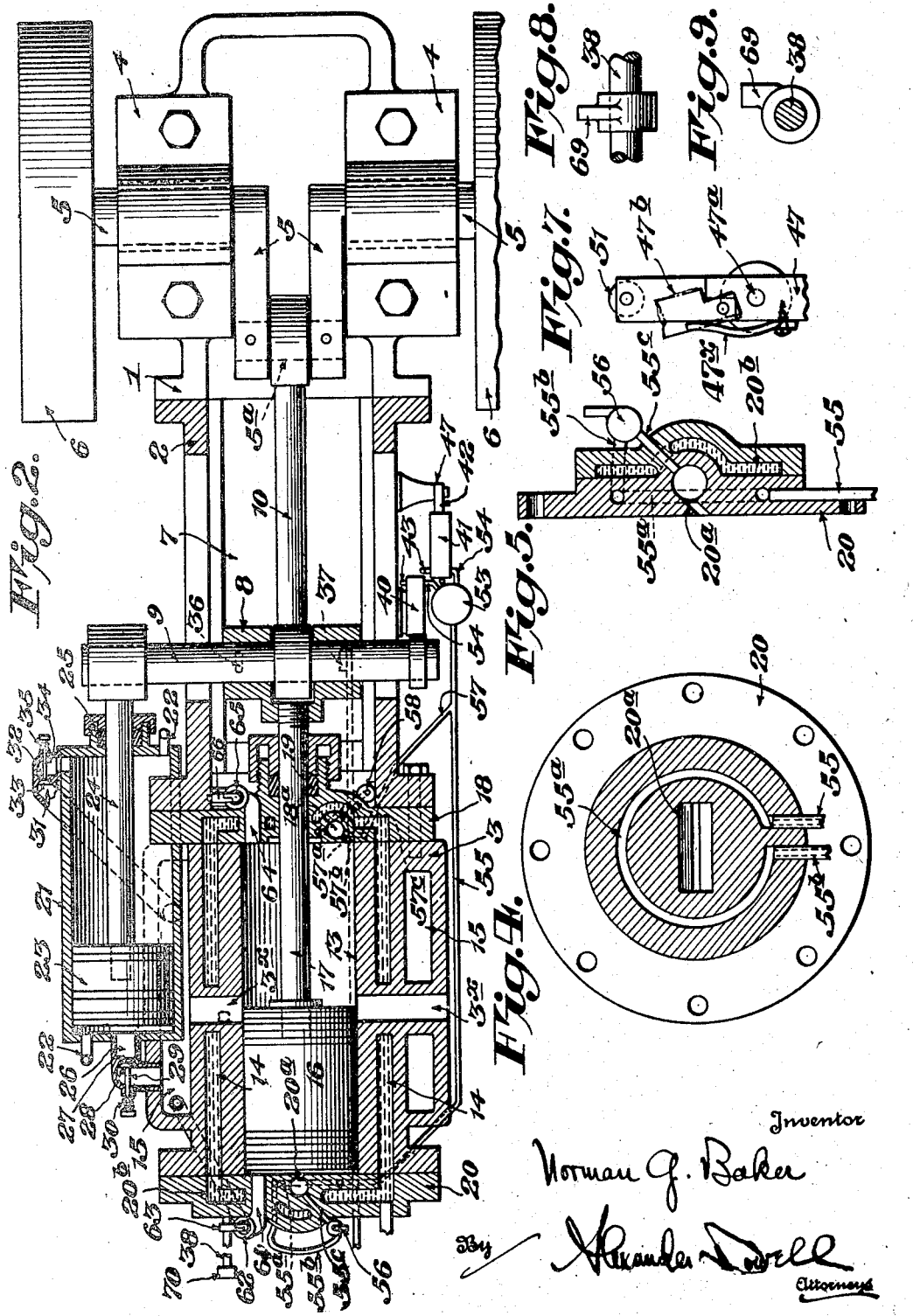
Inventor
Norman G. Baker
By Alexander Dowell
Attorneys Patented Dec. 3, 1946

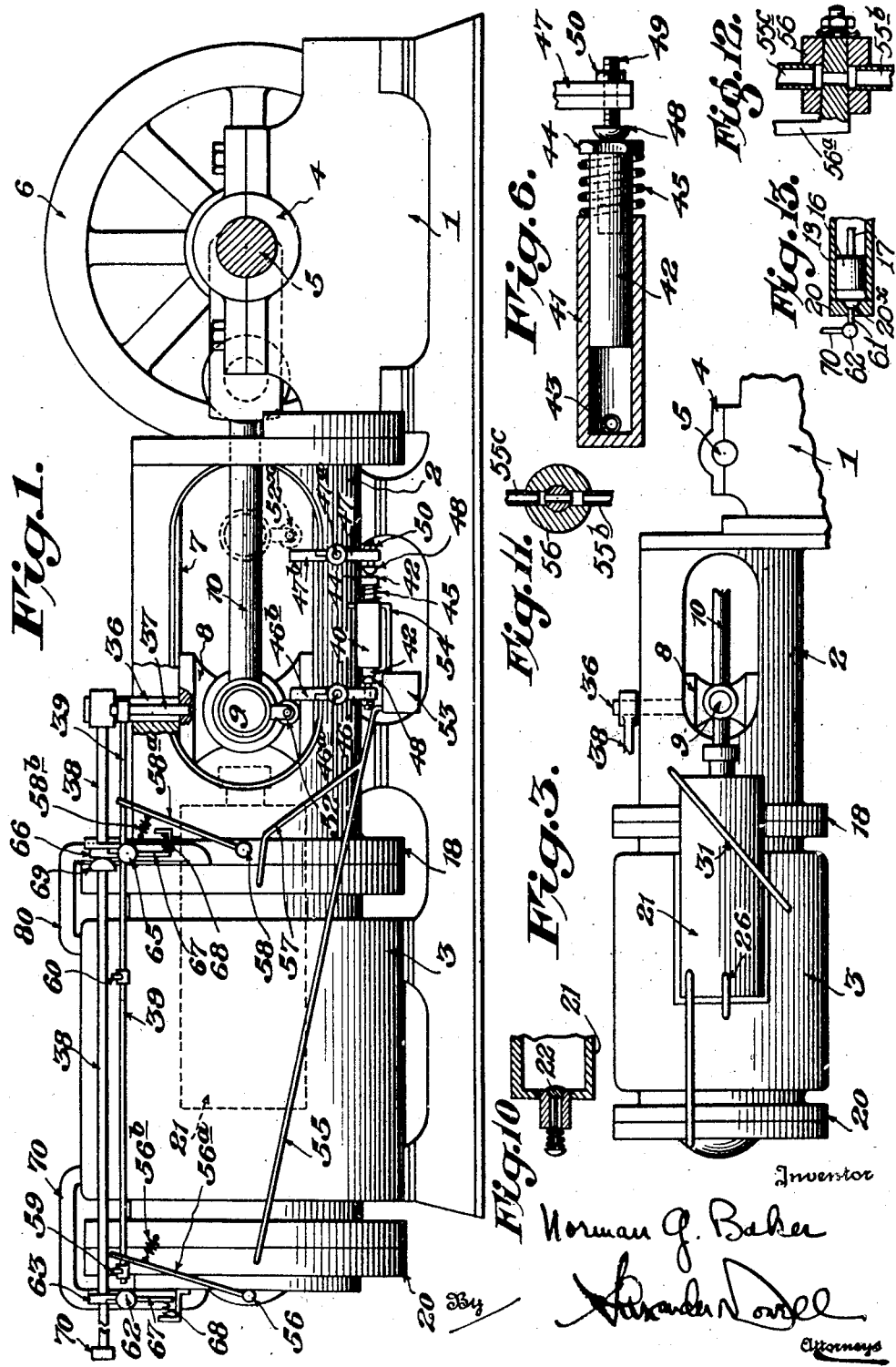

2,412,029

UNITED STATES PATENT OFFICE 2,412,029

DIESEL ENGINE

Norman G. Baker, Laredo, Tex.

Application April 25, 1944, Serial No. 532,618

18 Claims. (Cl. 123—61)

This invention is a novel improvement in internal combustion engines, particularly Diesel engines, and the principal object thereof is to provide a novel engine involving the use of a single cylinder, having firing heads at each end in which a single double-headed piston operates, thus giving power strokes when the piston is moving in both directions, resulting in twice the normal power of an engine having the same weight.

Another object of the invention is to provide an engine of the above type having means for cracking or gasifying the fuel by heat immediately prior to the time the fuel is injected into the cylinder heads; means being also provided whereby compressed air is injected into the cylinders for the purpose of self-cleaning same of exhaust gases and for providing pre-compression; and the arrangement of valves being such that no inlet, exhaust or air valves are disposed near the heated areas of the cylinder heads, resulting in an engine in which none of said valves can be burned or scorched.

A further object of the invention is to provide an engine of the above type in which the main cross-head thereof drives two push rods, one operating the firing head air valves leading from an air tank supplied with air under pressure by a double-acting air pump driven by the said cross-head, the other push rod operating the firing head fuel inlet valves, supplied with fuel under pressure by a pump or pumps driven by said cross-head, which pumps deliver more fuel than required, the surplus draining off for re-use.

Other minor objects of the invention will be hereinafter set forth.

I will explain the invention with reference to the accompanying drawings, which illustrate one practical embodiment thereof to enable others familiar with the art to adopt and use the same; and will summarize in the claims the novel features of construction, and novel combinations of parts, for which protection is desired.

In said drawings—

Fig. 1 is a side elevation, partly in section, of my novel engine, arranged as a Diesel type.

Fig. 2 is a plan view, partly in section, showing the single cylinder, piston, air pump, and the cylinder firing heads.

Fig. 3 is a reduced side elevation of the engine looking towards the air pump.

Fig. 4 is an enlarged transverse section through one cylinder head.

Fig. 5 is a vertical section through the cylinder head shown in Fig. 4.

Fig. 6 is an enlarged section through one of the fuel pumps, and showing its operating arm.

Figs. 7, 8 and 9 are detail views.

Fig. 10 is an enlarged detail section through the check valves.

Fig. 11 is a vertical section through one of the fuel valves.

Fig. 12 is a transverse section through one of the fuel valves.

Fig. 13 is an enlarged section through the turbulent air chambers.

As shown, the engine casing is preferably formed in three sections, 1, 2 and 3, and two cylinder head castings 18 and 20, all of which are aligned, and which are provided with bolting flanges whereby the aligned sections may be secured together in any desired manner. Section 1 carries split bearings 4 for a crank shaft 5 carrying fly wheels 6—6.

Section 2 carries guides 7 for a cross-head 8 carrying a cross-bar 9, the cross-bar 9 and cross-head 8 being connected by a pitman 10 with the crank 5a of shaft 5, so that as crank shaft 5 is rotated the cross-head and cross-bar will be reciprocated in the guides 7.

Section 3 is provided with the cylinder 13 extending from end to end thereof having centrally disposed exhaust ports 3x, and having a water jacket 14 formed therein around the cylinder 13, and having an air jacket or tank 15 formed therein around the water jacket 14 for the purpose hereinafter explained. Within the cylinder 13 is a double-headed piston 16 provided with the usual piston rings adjacent each end, said piston being connected by piston rod 17 to cross-head 8, whereby as the cross-head is reciprocated the piston 16 will be correspondingly reciprocated in the cylinder. Piston rod 17 passes through a cylinder head 18 provided with a central bore therefor and having a stuffing box 19 at its outer side to prevent leakage of gases along the piston rod exteriorly of cylinder 13. The opposite or outer end of cylinder 13 is provided with a second cylinder head 20.

Mounted or cast upon one side of section 3 is an air pump cylinder 21 having air vents 22 at each end provided with inwardly opening check valves (Fig. 10), whereby upon each stroke of the piston 23 air will be sucked into the opposite end of the air cylinder 21. Within cylinder 21 is a double-acting piston 23 provided with the usual piston rings, said piston 23 being connected by piston rod 24 with the cross-bar 9 of the cross-head 8 for actuation thereby, piston rod 24 passing through a stuffing box 25 in the adjacent end of cylinder 21.

One end of air pump casing 21 is provided with a duct 26 leading directly into the air jacket or tank 15 formed around the section 3, said duct having a valve seat 27 for a valve 28 opening outwardly of the cylinder 21, said valve 28 having a stem 29 normally urged by spring 30 into closed position, but when the piston 23 is moving towards the left, Fig. 2, valve 28 will be opened by air pressure while the check valve in vent 22 at the adjacent end of cylinder 21 is closed, and thus compressed air will be forced directly through duct 26 into the compressed air jacket 15.

Similarly the opposite end of air cylinder 21 is provided with a duct 31 also leading into the air jacket 15, said duct being provided with a seat 32 for a valve 33 opening outwardly of the cylinder 21, said valve having a stem 34 normally urged by spring 35 into closed position, whereby when the piston 23 is moving towards the right, Fig. 2, compressed air will be forced into the air tank 15, the check valve in the air vent 22 at the adjacent end of cylinder 21 being at that time closed.

Extending upwardly of the cross-bar 9 or crosshead 8 above the section 2 are a pair of spaced arms 36 and 37 (Figs. 1 and 2), arm 36 being connected to a push rod 38 axially movably mounted in guides on the exterior of section 3 parallel with the axis thereof, said rod controlling the air valves at the cylinder heads 18 and 20, as hereinafter explained. Arm 37 is similarly connected to a push rod 39 mounted in guides on the exterior of section 3 parallel with the axis thereof, rod 39 operating the fuel inlet valves in the cylinder heads 18 and 20 as hereinafter described, said push rods 38 and 39 thus moving with the cross-head 8.

Mounted upon the side of section 2 are a pair of fuel pumps 40 and 41, each pump having piston plungers 42 (Fig. 6) extending through opposite ends of the cylinders, the inner ends of the cylinders being closed and being provided with fuel inlets 43 connected with a suitable source of fuel supply. Preferably, as shown in Fig. 6, the outer end of each plunger 42 is provided with an enlarged head 44 and a coil spring 45 is disposed around the projecting end of the piston between the head 44 and the adjacent end of cylinder 40 or 41 for normally urging the pistons outwardly of the cylinders and for purpose of maintaining the piston actuating arms, hereinafter described, in normal position.

On the side of section 2 adjacent the outer end of each piston 42 are pump actuating levers 46, 47 respectively (Fig. 1) pivoted thereon at 46a, 47a, each lever carrying at its lower end a head 48 (Figs. 1 and 6) adapted to bear directly upon the outer end of its related piston 42, each head 48 being carried by a screw rod 49 threaded into the lower end of the levers 46 or 47 whereby the distance of the head 48 from the levers 46, 47 may be adjusted, a lock nut 50 being provided on each screw rod 49 to bind same in adjusted position. The levers 46, 47 are provided with upper members 46b, 47b respectively (Figs. 1 and 7), which are so pivoted as to cause their related levers to swing therewith when the pivoted members 46b, 47b are moved in one direction, but to yield when the members 46b, 47b are moved in the opposite direction, spring means 47x (Fig. 7) being provided for normally maintaining the members 46b, 47b respectively in alignment with their related levers 46, 47. If desired the upper ends of the levers 46b, 47b may be provided with rolls 51 (Fig. 7) to reduce sliding friction against the lever operating trip 52 which is mounted on cross-head 8 in line with the respective members 46b, 47b, said trip preferably carrying a roller projecting below the upper ends of the members 46b, 47b.

As shown in Fig. 1 the member 46b is adapted to yield without actuating its respective lever 46 when the crosshead 8 is moved to the right (Fig. 1) to permit the trip 52 to move therepast without actuating lever 46, said trip 52 when it contacts the member 47b during such movement to the right causing the lower end of lever 47 however to be swung so as to shift the related plunger 42 of fuel pump 41 to the left (Fig. 1) thereby actuating fuel pump 41 until the trip 52 passes beyond member 47b into the position shown at 52x, in dotted lines, Fig. 1. During the return stroke to the left (Fig. 1) the trip 52 will initially swing the member 47b which yields when moved in such direction without manipulating the lever 47, but when trip 52 engages the member 46b the lower end of lever 46 will be shifted so as to move the related plunger 42 of fuel pump 40 to the right (Fig. 1), thereby operating the fuel pump 40 until the trip 52 passes over member 46b and assumes the position shown in full lines in Fig. 1 at the end of the return stroke. Thus a fuel pump 40 or 41 is actuated on each stroke of the cross-head, each pump delivering fuel oil under pressure to a pressure cup 53 through pipes 54 for delivery to the firing nozzles of the engine in cylinder heads 18 and 20 as hereinafter explained.

While the stroke of the plungers 42 of the fuel pumps may be small, each pump is of such capacity that it will deliver an excess of fuel oil, the surplus draining off for re-use from the pressure cup 53 through a suitable valved conduit (not shown) set at desired pressure. Any standard fuel oil pump may be utilized in place of the pumps 40 and 41 shown.

From the pressure cup 53 a fuel pipe 55 leads into a circular duct 55a (Figs. 4 and 5) around the firing nozzle 20a of cylinder head 20, said duct 55a being connected by pipe 55b with a fuel valve 56 (Figs. 11 and 12), which valve has a pipe 55c leading directly into the nozzle 20a of cylinder head 20. The pressure cup 53 is also directly connected by pipe 57 with a circular duct 57a formed around the firing nozzle 18a of cylinder head 18, said circular duct 57a being connected by pipe 57b with a valve 58 from which a pipe 57c leads directly into the nozzle 18a of cylinder head 18.

As shown in Figs. 4 and 5, the nozzle 20a in the cylinder head 20 is disposed centrally of head 20 and the circular duct 55a extends substantially entirely around the said nozzle so as to pre-heat the fuel by the heat of the cylinder head before the same passes to the fuel valve 56, thereby gasifying fuel into vapor for the purpose of quicker ignition and proper mixture of the fuel vapors with the compressed air. The cylinder head 20 is also provided with water cooling ducts 20b which register with the water ducts 14 of member 3 as shown in Fig. 2, said water ducts being spaced from the circular fuel duct 55a of said head.

The cylinder head 18 is constructed similarly to the cylinder head 20 shown in Figs. 4 and 5, except that the nozzle 18a and circular duct 57a necessarily disposed off-center owing to the passage of the piston rod 17 therethrough. However, the function of the nozzle and circular duct is identical with those above described in connection with cylinder head 20.

Valve 56 of cylinder head 20 has a stem 56a (Fig. 1) extending upwardly at an angle and terminating adjacent push rod 39, a spring 56b normally maintaining the arm in position to close the valve 56. Similarly the valve 58 of cylinder head 18 is provided with an arm 58a extending upwardly at an angle and terminating adjacent the push rod 39, a spring 58b normally maintaining the arm 58a in such position as to close the valve 58. On the push rod 39 is a trip 59 adapted to engage the valve lever 56a when the rod is moving to the left (Fig. 1) and open the valve to deliver fuel to the firing nozzle 20a a few degrees before dead-center, the valve being returned to normal position by means of spring 56b as soon as the trip 59 has passed over lever 56a. Push rod 59 also carries a second trip 60 similar to trip 59 adapted to engage the lever 58a of valve 58 and to open said valve 58 a few degrees before dead-center during the inward stroke of cross-head 8, the valve being returned to normal position after the trip 60 has passed over lever 58d by means of spring 58b.

Head 20 is provided with a turbulence chamber 20x (Fig. 13) and a compressed air duct 61 (Fig. 13) leads from an air valve 62 (Figs. 2 and 13) having an arm 63 (Fig. 2) disposed adjacent the push rod 38, while head 18 is provided with a similar turbulence chamber and with an air duct 64 leading from an air valve 65 having an arm 66 also terminating adjacent the push rod 38. Each of the valves 62 and 65 is maintained in normal closed position by means of arms 67 (Fig. 1), the outer ends of which are engaged by springs 68 which yieldably maintain the arms 67 in position to close the valves 62 and 65. Preferably the upper ends of arms 63 and 66 of valves 62 and 65 are hinged in the same manner as the arms 47—47b shown in Fig. 7 so as to yield when engaged by trips on the push rod moving in one direction and to actuate the valves when engaged by the trips on rod 38 moving in the opposite direction. Push rod 38 when moving to the left (Fig. 1) is provided with a trip 69 (Figs. 1, 2, 8 and 9) adapted to engage the lever 66 and open the air valve 65 and admit air into the air duct 64 when the piston is nearing the outward end of its stroke as shown in Fig. 2, said trip 69 moving past the lever 66 when engaging same from the opposite direction. Push rod 38 is also provided with a trip 70 adapted to engage the lever 63 when nearing the inward end of the stroke, i. e., after moving towards the right (Fig. 2) and to slide past the lever 63 when engaging same from the opposite side.

In operation, as the crank shaft 5 rotates the air pump 21 will be actuated to maintain the air tanks 15 of section 3 filled with compressed air, and at the same time the fuel pumps 40 and 41 will be actuated to maintain a constant supply of fuel under pressure in the pressure cup 53. In the position of parts shown in Fig. 2 the piston is at the outward end of the cylinder 13 and has just received its fuel charge a few degrees before reaching dead center. After the fuel is ignited the piston 16 will start on its power stroke moving to the right, Fig. 2. When the piston approaches the end of said stroke the exhaust ports 3x in cylinder 13 will be uncovered by the piston, said ports 3x being so placed with respect to the length of the piston 16 that when in either dead center position the ports are open for discharging exhaust gases at the opposite end of the cylinder, the ports being about one-half open and being large enough for exhaust purposes.

When the piston approaches the end of the inward stroke (to the right in Fig. 1) the air valve 62 in the outer cylinder head 20 is opened by trip 70 to admit air through duct 61 and pipe 90 from the air tank 15 of section 3 into the outer end of cylinder 13 to drive out the spent gages, the air continuing until the piston closes the exhaust ports 3x on the return stroke, thereby leaving the outer end of cylinder 13 filled with compressed air, which air is highly compressed after exhaust ports 3x are closed as the piston moves from the right towards the left in Fig. 1. When the piston approaches the end of the first or inward power stroke the inner end of the cylinder has been cleared of spent gases from the last firing in said end of the cylinder and said end of the cylinder has been filled with pre-compressed air, and near the end of the inward stroke the fuel valve 58 has been opened to inject fuel vapors into the pre-compressed air at said end, whereupon the engine fires at said inner end. At the time of firing the air valve 62 has opened to clear the gases in the outer end of the cylinder and to admit compressed air therein which is pre-compressed during the second or outward stroke, the pre-compressed air in the outer end receiving fuel injection from valve 56 just prior to firing. Thus there are two power strokes for each revolution of the flywheels 6. According to my arrangement the fuel may be injected from 5 to 8° before reaching dead center and the fuel will be ignited at about 2 to 3° before dead center. Near the end of the power stroke the exhaust valve will open at about 42° before the next dead center. Also air valve at the opposite end of the cylinder will open at about 8° before the dead center and remain open until about 5° past center on the next stroke to drive out the spent gases and fill the end of the cylinder with compressed air to receive the fuel charge for the next firing.

I do not limit my invention to the exact form shown in the drawings, for obviously changes may be made therein within the scope of the claims; also if less compression were used the engine, equipped with sparking devices could be used as an internal combustion engine; also the air ducts 61 and 62 may be formed as turbulence chambers 20x (Fig. 13) in the general manner disclosed in my copending application Serial No. 481,141 filed March 30, 1943, and the fuel oil from pipes 55b and 57c might be sprayed into the whirling air in said chambers for quick mixture therewith, if desired.

Also, air valves 62 and 65 could, if desired, be operated in the usual manner by cams mounted upon a cam shaft driven by the crankshaft 5; and the fuel valves 56 and 58 could likewise be so operated, said cam operated valves being very positive in action. Moreover, a pair of single acting air pumps could be used in place of the double acting air pump 21, one pump of the pair being disposed at each side of the engine cylinder to equalize the thrust on the crosshead arm 9.

I claim:

1. In a Diesel engine of the character specified, a cylinder; a double-headed piston in said cylinder; cylinder heads respectively having firing nozzle at the ends of the cylinder; an air jacket; a fuel pressure tank; valved air ducts leading from the air jacket through the cylinder heads respectively; and valved fuel preheating ducts in the cylinder heads respectively disposed around the firing nozzles.

2. In an engine as set forth in claim 1, said cylinder heads having turbulent air chambers discharging into the firing nozzles and into which the air ducts extend, and into which the fuel is injected.

3. A Diesel engine of the character specified, comprising a crank shaft; a cylinder having exhaust ports at its mid-length; a double-headed piston in said cylinder operating said crank shaft; cylinder heads respectively having firing nozzles at the ends of the cylinder; an air tank; a fuel pressure tank; valved air ducts leading from the air tank through the cylinder heads respectively; valved fuel preheating ducts in the cylinder heads respectively disposed around the firing nozzles; ducts leading from the fuel pressure tank into said preheating ducts respectively; means operated by the piston for actuating the air valves to admit scavenging air into the ends of the cylinder after each firing stroke, said excess air being pre-compressed therein by the next firing stroke; and means operated by the piston for admitting fuel into the firing nozzles of the heads just prior to each firing stroke, whereby said engine will have two firing strokes for each revolution of the crank shaft.

4. In an engine as set forth in claim 3, said engine comprising a crank shaft section, a guide section carrying a cross-head connected with the crank shaft and with the piston; a cylinder section; and cylinder head sections at each end of the cylinder; said sections being secured together in axial alignment.

5. In an engine as set forth in claim 3, a double-acting pump cylinder mounted on the engine cylinder and having a pump piston therein operated by the engine piston; air vents provided with inwardly opening check valves at each end of the pump cylinder for admitting air therepast on each suction stroke of the pump piston; and ducts extending from each end of the cylinder provided with outwardly opening check valves, said ducts discharging into the air tank.

6. In an engine as set forth in claim 3, a pair of parallel pumping cylinders having plungers extending from their opposite ends, operating levers adjacent the said plungers and having adjustable heads respectively engaging their related plungers to vary the stroke of the pump plungers; means yieldably maintaining the plungers in normal projected positions and their related levers in normal position; a trip operated by the piston; and said levers carrying opposed yieldable trip engaging members adapted to yield when the trip is moving in one direction and to actuate their related levers when the trip is moving in the opposite direction, whereby each stroke of the piston will actuate on said pump.

7. In an engine as set forth in claim 3, said cylinder exhaust port being of such length that the same will be half uncovered by the piston when in either dead center.

8. In an engine as set forth in claim 3, said air duct valves having operating levers; means yieldably maintaining the levers in position to close the valves; a push rod operated by the piston and disposed adjacent both said levers; trips on said push rod adapted to actuate said valves; and said levers having yieldable trip engaging members thereon adapted to yield when the trips are moving in one direction and to actuate their related levers when the trips are moving in the opposite direction.

9. In an engine as set forth in claim 3, said fuel duct valves having operating levers; means yieldably maintaining the levers in position to close the valves; a push rod operated by the piston and disposed adjacent both said levers; and trips on said push rod adapted to actuate said valves.

10. In an engine as set forth in claim 3, said cylinder heads having turbulent air chambers discharging into the firing nozzles and into which the air ducts extend; and said fuel valves directing fuel into said chambers.

11. A Diesel engine of the character specified, comprising a crank shaft; a cylinder having exhaust ports at its mid-length; a double-headed piston in said cylinder operating said crank shaft; cylinder heads respectively having firing nozzles at the ends of the cylinders; said cylinder and cylinder heads having cooling water jackets; an air jacket disposed around said water jacket; a double-acting air pump operated by the piston; a fuel pressure tank; a double-acting fuel pump operated by the piston; valved air ducts leading from the air jacket through the cylinder heads respectively; valved fuel preheating ducts in the cylinder head respectively disposed around the firing nozzles; ducts leading from the fuel pressure tank into said preheating ducts respectively; means operated by the piston for actuating the air valves to admit scavenging air into the ends of the cylinder after each firing stroke, said excess air being pre-compressed therein by the next firing stroke; and means operated by the piston for admitting fuel into the ends of the cylinders just prior to each firing stroke, whereby said engine will have two firing strokes for each revolution of the crank shaft.

12. In an engine as set forth in claim 11, said engine comprising a crank shaft section, a guide section carrying a cross-head connected with the crank shaft and with the piston; a cylinder section; and cylinder head sections at each end of the cylinder; said sections being secured together in axial alignment.

13. In an engine as set forth in claim 11, said air pump comprising a pump cylinder mounted on the engine cylinder and having a pump piston therein operated by the engine piston; air vents provided with inwardly opening check valves at each end of the pump cylinder for admitting air therepast as the pump piston is moving towards the opposite end of the pump cylinder; and ducts extending from each end of the cylinder provided with outwardly opening check valves, said ducts discharging into the air jacket.

14. In an engine as set forth in claim 11, said pump comprising a pair of parallel pumping cylinders having plungers extending from their opposite ends; operating levers adjacent the said plungers and having adjustable heads respectively engaging their related plungers to vary the stroke of the pump plungers; means yieldably maintaining the plungers in normal projected positions and their related levers in normal position; a trip operated by the piston; and said levers carrying opposed yieldable trip engaging members adapted to yield when the trip is moving in one direction and to actuate their related levers when the trip is moving in the opposite direction, whereby each stroke of the piston will actuate one said pump piston.

15. In an engine as set forth in claim 11, said cylinder exhaust port being of such length that the same will be half uncovered by the piston when in either dead center.

16. In an engine as set forth in claim 11, said air duct valves having operating levers; means yieldably maintaining the levers in position to close the valves; a push rod operated by the piston and disposed adjacent both said levers; trips on said push rod adapted to actuate said valves; and said levers having yieldable trip engaging members thereon adapted to yield when the trips are moving in one direction and to actuate their related levers when the trips are moving in the opposite direction.

17. In an engine as set forth in claim 11, said fuel duct valves having operating levers; means yieldably maintaining the levers in position to close the valves; a push rod operated by the piston and disposed adjacent both said levers; and trips on said push rod adapted to actuate said valves.

18. In an engine as set forth in claim 11, said cylinder heads having turbulent air chambers discharging into the firing nozzles and into which the air ducts extend; and said fuel valves directing fuel into said chambers.

NORMAN G. BAKER.